(12) United States Patent
Harsley

(10) Patent No.: US 10,407,226 B2
(45) Date of Patent: Sep. 10, 2019

(54) TIE STRIPS

(71) Applicant: RAPSTRAP LIMITED, Hertfordshire (GB)

(72) Inventor: Andrew John Harsley, Grantham (GB)

(73) Assignee: RAPSTRAP LIMITED, Hertfordshire (GB)

( * ) Notice: Subject to any disclaimer, the term of this patent is extended or adjusted under 35 U.S.C. 154(b) by 319 days.

(21) Appl. No.: 14/767,855

(22) PCT Filed: Feb. 14, 2014

(86) PCT No.: PCT/GB2014/000050
§ 371 (c)(1),
(2) Date: Aug. 13, 2015

(87) PCT Pub. No.: WO2014/125241
PCT Pub. Date: Aug. 21, 2014

(65) Prior Publication Data
US 2016/0001943 A1 Jan. 7, 2016

(30) Foreign Application Priority Data
Feb. 14, 2014 (GB) .................................. 1302566.3

(51) Int. Cl.
*B65D 63/10* (2006.01)
*F16L 3/233* (2006.01)

(52) U.S. Cl.
CPC ..... *B65D 63/1027* (2013.01); *B65D 63/1018* (2013.01); *F16L 3/2336* (2013.01); *B65D 2563/106* (2013.01); *Y10T 24/1498* (2015.01)

(58) Field of Classification Search
CPC .............. Y10T 24/141; Y10T 24/1498; B65D 2563/106
See application file for complete search history.

(56) References Cited

U.S. PATENT DOCUMENTS

| | | |
|---|---|---|
| 2,011,039 A | 7/1933 | Crothers |
| 3,224,054 A | 2/1963 | Lige |
| 3,438,095 A | 8/1967 | Evans |
| 3,913,178 A | 10/1975 | Ballin |
| 3,955,245 A | 5/1976 | Ballin |
| 3,973,610 A | 8/1976 | Ballin |
| 4,045,843 A | 9/1977 | Loose |
| 4,077,562 A * | 3/1978 | Ballin ................... B65D 63/10 24/16 PB |
| 4,473,524 A | 9/1984 | Paradis |
| 4,728,064 A | 3/1988 | Caveney |

(Continued)

FOREIGN PATENT DOCUMENTS

| | | |
|---|---|---|
| GB | 811973 | 4/1959 |
| WO | WO 2011/039742 A1 | 7/2011 |

*Primary Examiner* — Abigail E Troy
(74) *Attorney, Agent, or Firm* — Blank Rome LLP

(57) ABSTRACT

A high strength multiple-use cable tie (1), formed in a ladder-shaped construction comprising two substantially linear side rails (2) of generally uniform cross-section. These rails are interconnected by a plurality of closely spaced curved or chevron rungs (3) which define between them similarly shaped apertures (4). The free end (51) of the strip can readily pass through an aperture in a forward direction and form a closed loop, but when pulled in the reverse direction, the rungs engage to form a co-operative latch and thereby prevent withdrawal.

18 Claims, 16 Drawing Sheets

(56) References Cited

U.S. PATENT DOCUMENTS

| | | | |
|---|---|---|---|
| 5,154,376 A * | 10/1992 | Baum | F16L 3/2332 24/16 PB |
| 5,799,376 A | 9/1998 | Harsley | |
| 5,836,053 A | 11/1998 | Davignon et al. | |
| 7,337,502 B2 | 3/2008 | Mermelshtein | |
| 7,704,587 B2 | 4/2010 | Harsley | |
| 2013/0014350 A1 | 1/2013 | Lie | |

* cited by examiner

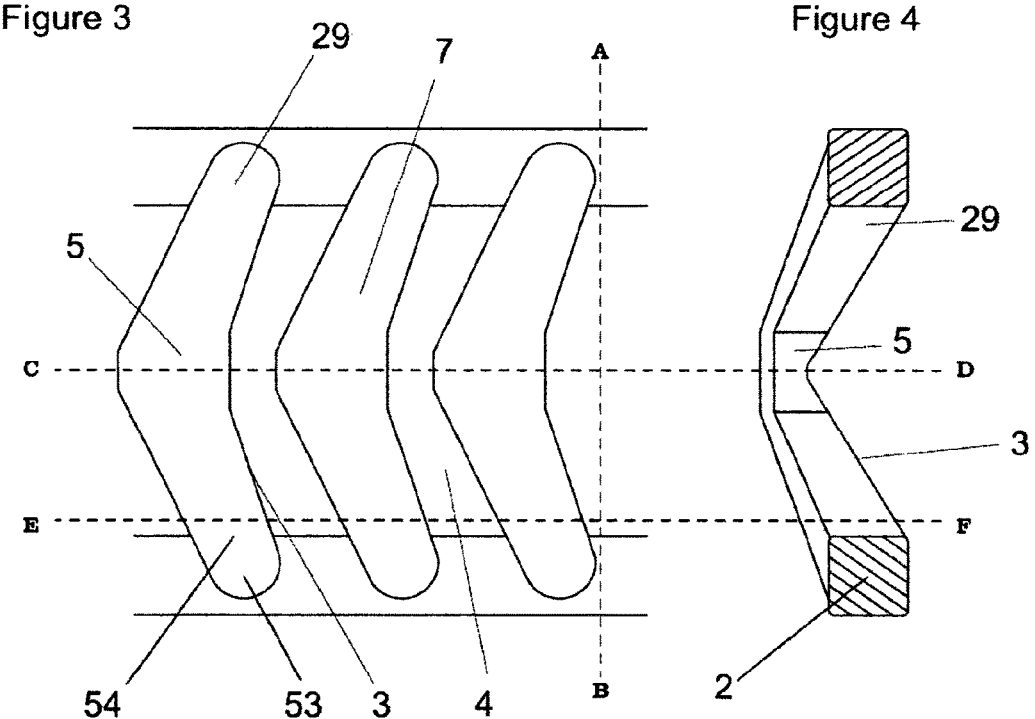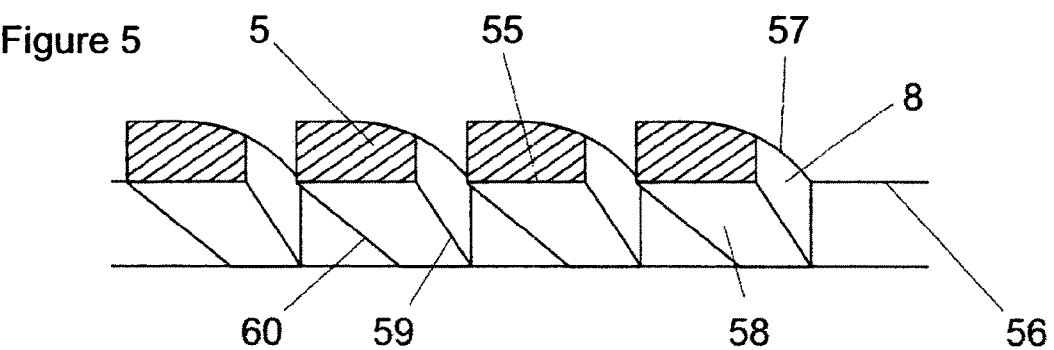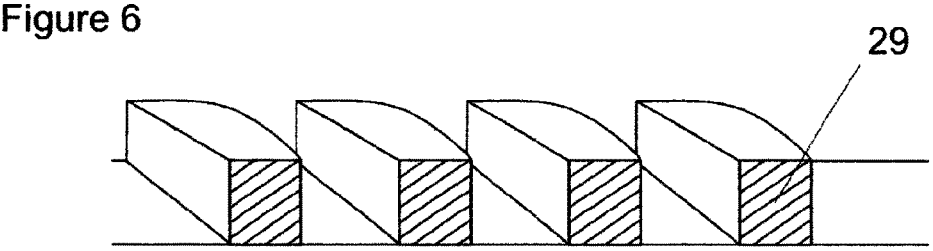

a)

TIE STRIPS

RELATED APPLICATIONS

This application is a national phase of PCT/GB2014/000050 filed on Feb. 14, 2014, which claims priority to Great Britain Application No. 1302566.3 filed on Feb. 14, 2013. The contents of those applications are hereby incorporated by reference.

FIELD OF INVENTION

The present invention relates to tie strips and similar bundling devices, for example cable ties or horticultural plant ties.

BACKGROUND TO THE INVENTION

Cable ties and other forms of tie strip are widely used to quickly and easily secure items together. For example, sealing bags, bundling cables, or binding plants to stakes.

The conventional cable tie strip, as still widely used in industry, is first described by GB811973 (SOPACEM, Wrobel). It is generally injection moulded from nylon 66 and comprises a robust apertured head, extending from which is a slimmer flexible tail. In use, this tail portion is inserted through the remote aperture in the head, wherein a pawl engages with a series of ratchet teeth spaced along the tail. A constrictive loop is thus formed which can be tightened around the target.

modern examples of such cable ties are approximately 5 mm wide and 1 mm thick, with latching teeth spaced every 1.0 to 1.5 mm or so. The usual strength rating for such ties is 50 lbs (22.7 kg) when looped.

However, it has long been recognised that these ties are inherently inefficient, since after fitting, a significant portion of the tail is often wasted. To alleviate this, manufacturers are burdened with providing a wide variety of lengths, and users with stocking and selecting the most appropriate size for any given application. In practice, this seldom happens, and users frequently use oversized ties which inevitably leads to increased wastage.

In response, many inventors have tried to create more efficient "multiple-use" tie strips using various repeating sequences of interlocking apertures and latching members. Necessarily, the transverse width of the bulk strip is greater than the transverse width of the apertures through which it must pass, hence some deformation of the strip is required to allow threading.

Three general methods have been described in the known prior art, with the earliest ones being DE1079537 (Grzemba) and U.S. Pat. No. 3,224,054 (Lige). Both utilise longitudinal slots whose lengths are comparable to the greatest width of the strip. Consequently, a simple rotation of the free end by 90° allows the strip to readily pass through any chosen slot and form a loop. (A reverse 90° twist is then invoked to lock the tie in place.)

A second approach is to fold or curl the strip about its longitudinal axis, creating a more compact cross-sectional shape that better matches the width and shape of the provided apertures. This method is described in patents U.S. Pat. Nos. 3,913,178, 3,955,245, 3,973,610 and 4,077,562 (all Bailin), and also in U.S. Pat. No. 4,045,843 (Loose) and U.S. Pat. No. 4,150,463 (Brown).

The third method is to employ a chain of deformable cells that can laterally narrow and/or enlarge as the strip is pulled through itself. This may be done by use of mechanical spring portions that bend, or by using elastomeric materials that can stretch. Such approaches are described in U.S. Pat. No. 3,433,095 (Evans), U.S. Pat. No. 5,799,376 (Harsley) and U.S. Pat. No. 7,704,587 (Harsley).

Each approach has relative pros and cons, but a general consequence of all is a greater spacing between the latching points due to the introduction of the additional apertures. As a result, the latches typically end up 6 to 10 mm apart and the diameter of the tie can therefore only be adjusted in intervals of roughly 2 or 3 mm. This does not compare favourably with a conventional cable tie, which can be pulled much tighter with diameter adjustments below 0.5 mm.

The most effective solution so far has been the development of tie strips with the ability to stretch longitudinally, wherein applying additional tension draws the next latch through the aperture, allowing the tie to be pulled tight. This technique is described in the prior art of Evans and Harsley, and has led to commercially acceptable products. However, since these strips need to be stretchy to work, they are usually made from polyurethane rather than polyamide (nylon 66). Consequently they are not always a perfect replacement for convectional cable ties, being generally a little weaker and prone to sagging under heavy loads, especially in hot environments.

An alternative method is to retain a rigid strip, but implement sub-latches between the main latching points, as described by Loose and Brown. These are acknowledged as not being as strong as the main latches, but these ties are mostly intended for light duty applications such as hag tying where high strength requirements are not an issue.

U.S. Pat. No. 7,337,502 (Mermelshtein) takes this principle further by retaining the closely spaced latching teeth of the conventional cable tie design, but without the head portion. Instead, the apertures and latching pawls are formed by providing slits in the strip at required locations between the teeth. Deformation of the side walls during insertion then widens the aperture, allowing the strip to pass through itself. However, Mermelshtein states that his original design can only withstand up to 2 kg of force, and his improved ties little more than 8 kg. (WO2011039742, p 14.)

Looked at from a different perspective, the tie strips of Loose, Bailin and Brown may be compared to the ladder-style single-use tie strips described, for example, by U.S. Pat. No. 4,728,064 (Caveney) and U.S. Pat. No. 5,836,053 (Davignon). These follow the traditional cable tie design of apertured-head and extending tail, however the tail now comprises two parallel side rails extending between which are a plurality of rungs that co-operate with the head portion to function as latching members. The inventions of Loose, Ballin and Brown are essentially multiple-use variants of such ladder-style ties, and as noted in U.S. Pat. No. 4,473,524 (Paradis), their strength may be increased by cold-drawing to preferentially align the polymer molecules, albeit with an undesirable increase in rung spacing as well.

Ultimately, despite these numerous attempts, no waste-free alternative to the traditional Wrobel tie has yet been widely adopted by industry.

STATEMENT OF INVENTION

According to a first aspect of the invention, there is provided, a high strength multiple-use cable tie, formed in a ladder-shaped construction comprising two substantially linear side rails of generally uniform cross-section, the rails being interconnected by a plurality of closely spaced curved or chevron rungs which define between them similarly shaped apertures, wherein the free end of the strip can readily pass through an aperture in a forward direction and form a closed loop, but when pulled in the reverse direction, the rungs engage to form a co-operative latch and thereby prevent withdrawal.

Preferably the cable tie is formed from a polymer material.

Preferably still the cable tie is formed from nylon.

Preferably the side rails and interconnecting runs have a cross section of approximately 0.8 mm².

Preferably the side walls are formed with a rhomboidal cross section with side angles of approximately 5° to 10°.

Preferably the interconnecting rungs have longitudinal and vertical rakes of approximately 20° to 30°.

Preferably still the rungs are tapered outwardly the centreline both laterally and vertically.

Preferably the vertical rake of the top rung is approximately 15° and the vertical rake of the bottom rung is approximately 25°.

Preferably the leading edges of the rungs are rounded. Preferably still a cutaway notch is provided on the underside of the rear portion of each rung.

Preferably each rung includes a flattened section which widens the centreline portion of the rung.

Preferably the cable tie has a tapered front end having a pointed tip leading to a tapered feed portion.

Preferably the front tip is provided with raised grips or knurls.

When made from suitable polymers, a 6.4 mm wide version of the present invention can achieve a 1.8 mm latch spacing and a loop tensile strength exceeding 23 kg. The resulting tie strip of the present invention therefore offers a performance comparable to conventional nylon cable ties, but without the associated waste.

BRIEF DESCRIPTION OF THE DRAWINGS

Reference will now be made to the accompanying diagrams and drawings in which:

FIG. 3 shows an enlarged plan view of a section of the present invention;

FIG. 4 shows a cross-sectional end view of the present invention though the lateral cross-section A-B indicated in FIG. 3;

FIG. 5 shows a cross-sectional side view of the present invention though the longitudinal cross-section C-D indicated in FIG. 3;

FIG. 6 shows a cross-sectional side view of the present invention though cross-section E-F indicated in FIG. 3, looking inwards towards the longitudinal centreline A-B;

FIG. 8 shows a rung with a wide but thin central region together with squarer basal arm portions;

FIG. 9 shows a rung with wide but thin basal arm portions, together with a squarer central region;

FIG. 10 shows a rung with wide but thin side arm portions, together with squarer central and basal arm portions;

FIG. 11 shows a rung with wide but thin central and side arms portions, together with squarer basal arm portions;

FIG. 12 shows a rung with a wide but thin central region together with squarer basal arm portions, plus an even wider and thinner channel at the centre line;

FIG. 13 shows a rung with a wide but thin central region together with squarer basal arm portions, plus even wider and thinner channels along the side arm portions;

DETAILED DESCRIPTION OF PREFERRED EMBODIMENTS

Figure 7:
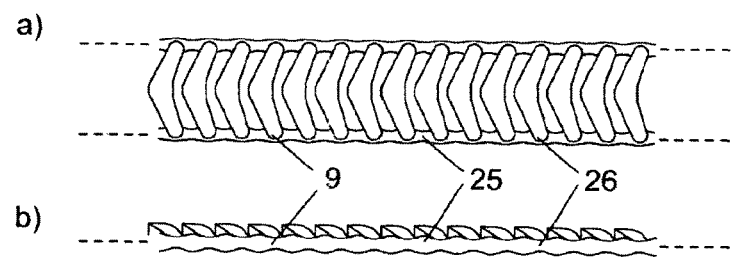
FIG. 7 illustrates a length of strip with side rails employing a variable aspect ratio.
Figure 8:
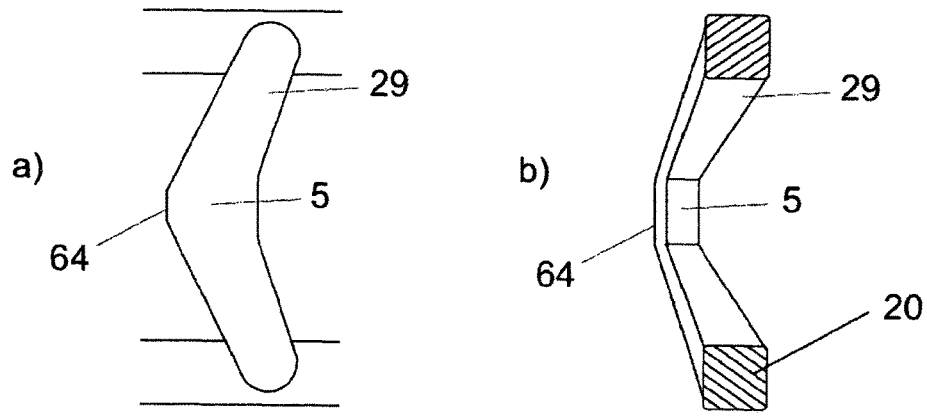
FIGS. 8 to 13 illustrate, in plan and cross-sectional views, various possible rung configurations, wherein specifically.
Figure 9:
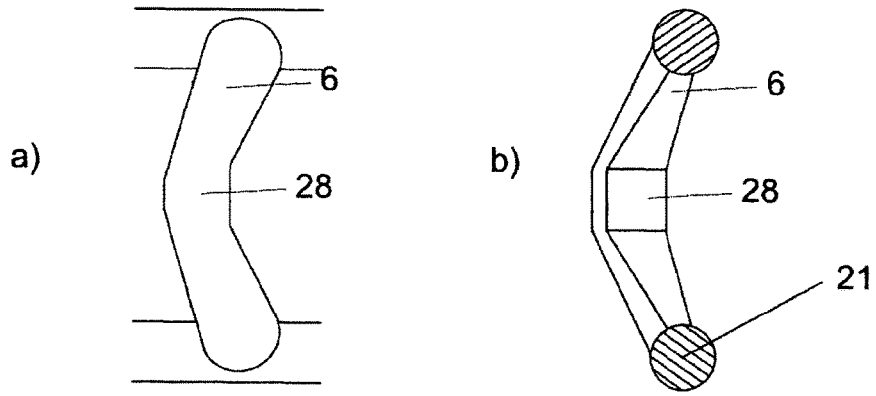
Figure 10:
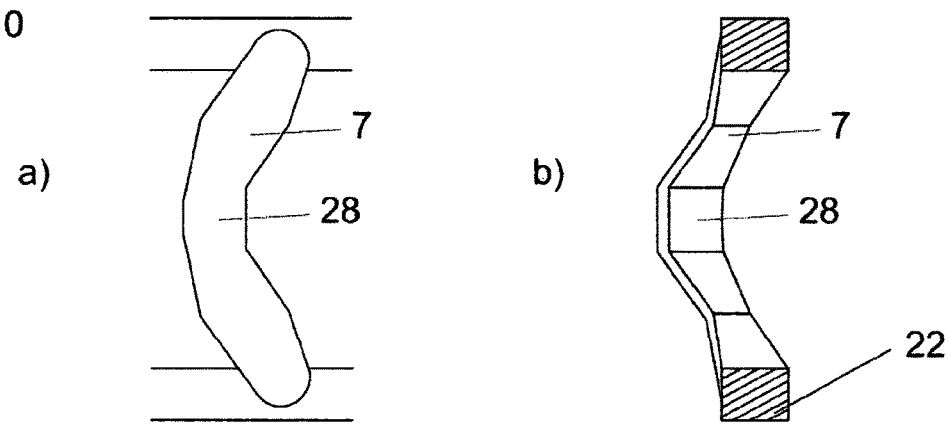
Figure 11:
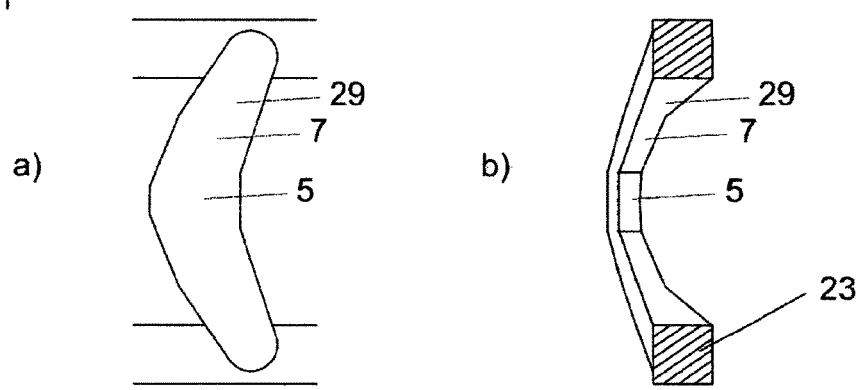
Figure 12:
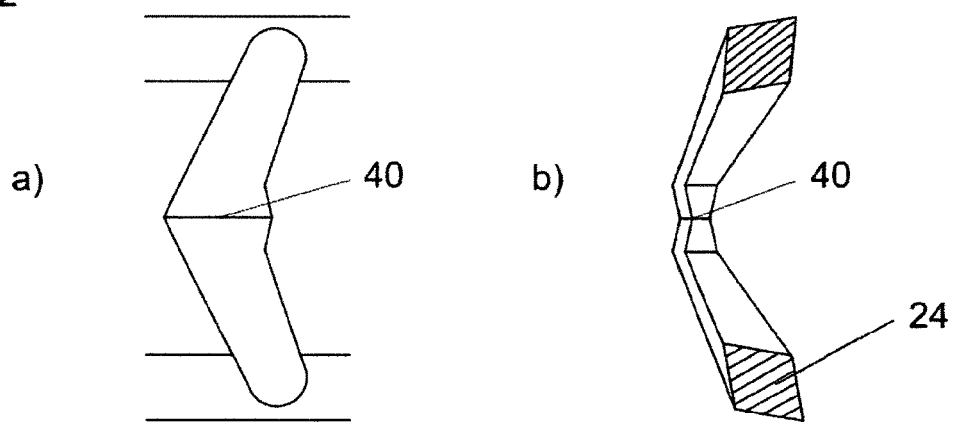
Figure 13:
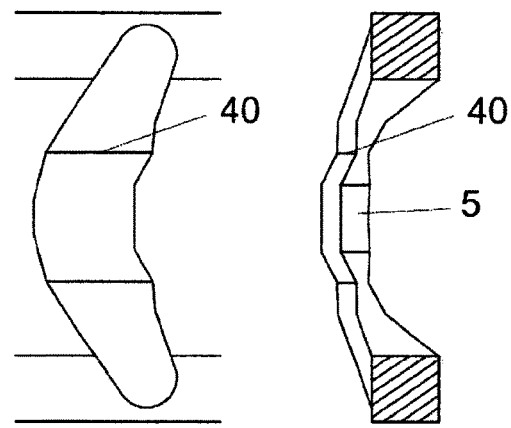
Figure 23:
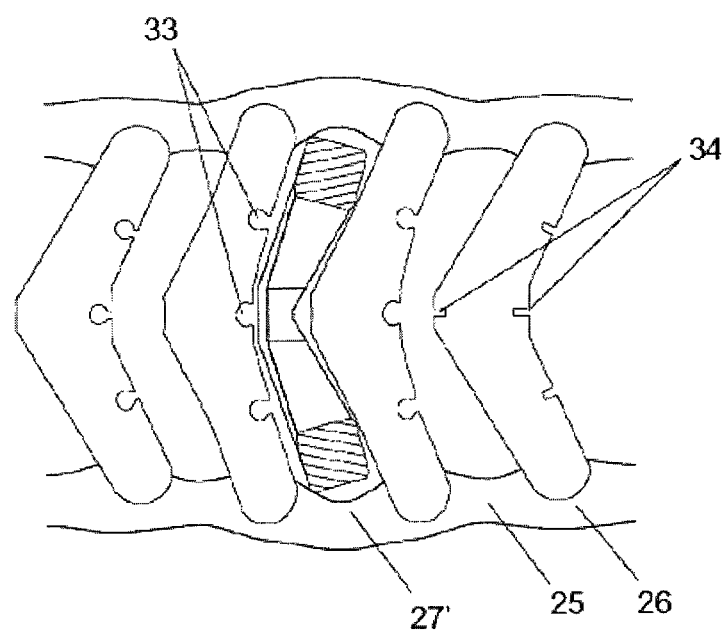
FIG. 23 shows notches and slots cut into the rungs at strategic points to increase their degree of deformation, together with the preferential bending of side walls with variable aspect ratios.

The tie strip of the present invention 1 (FIG. 1) comprises two generally parallel side rails 2, each with a substantially constant cross-sectional area. As shown in FIGS. 8 to 13, said rails are broadly circular 21, square 23, rectangular 22 or rhomboidal 24 in shape, and may have slightly rounded edges 20. Whilst maintaining the same cross-sectional area, the side rails may have a variable aspect ratio along their length 9 (FIG. 7), wherein they may be adapted to be taller and narrower 25 (or vice versa 26) in some regions to promote flexibility in a particular location or direction 27' (FIG. 23).

The two side rails are interconnected by a series of curved or chevron rungs 3, forming between them apertures of similar shape 4 (FIG. 3). These rungs are generally of similar dimensions to the side rails, although their aspect ratio may also be adjusted to induce beneficial flexing. As shown in FIGS. 8-13, they may specifically be wider and thinner at the central region 5 (or vice versa 28), wider and thinner at the basal region where they meet the side rails 6 (or vice versa 29), or wider and thinner at locations along the side arms 7 (or vice versa).

This process of creating a favourable region of flexibility may be extended further by the inclusion of even wider and narrower sections 40 (FIGS. 12 and 13) which may be advantageously positioned either at the centre of the rung or along the side arms. It should be noted that these sections are not intended to weaken the rung at their location, but merely to increase its flexibility by adjusting the aspect ratio. Indeed, during the process of tightening the tie, the strip tends to be pulled hard against the rear wall of the aperture, and thus the centre line of the rung should, if anything, be made more robust rather than weaker. For this reason it is also pragmatic to make the rungs slightly stronger than the side rails, such that if and when the strip does break, it does so cleanly at the sides rather than through a rung.

In extending from the side rails, the side arms are generally inclined towards the rear of the strip in all three dimensions, laterally, longitudinally and vertically (FIG. 5). This creates a double rake angle that points both backwards and upwards 8. The geometry of the rungs and rails is more fully illustrated in plan view in FIG. 3, and in cross-section in FIGS. 4, 5 and 6. FIG. 4 specifically shows the transverse cross-section A-B indicated in FIG. 3, and FIGS. 5 and 6 shows the longitudinal cross-sections C-D and E-G respectively. Although the chevron rungs in these diagrams are illustrated with straight edges, it may be readily appreciated that curved rungs with similar geometry may also be employed.

Figure 1:
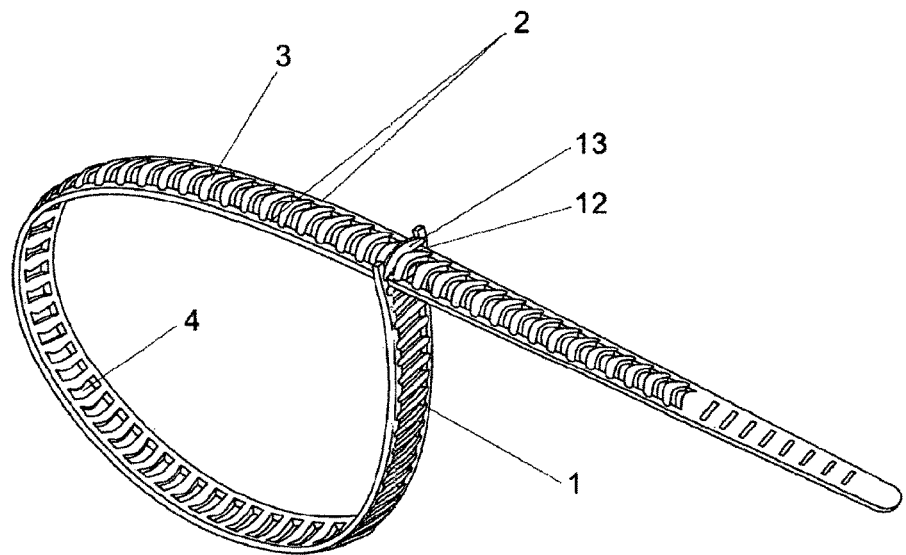
FIG. 1 illustrates, in perspective, a looped example of the present invention.
Figure 14:
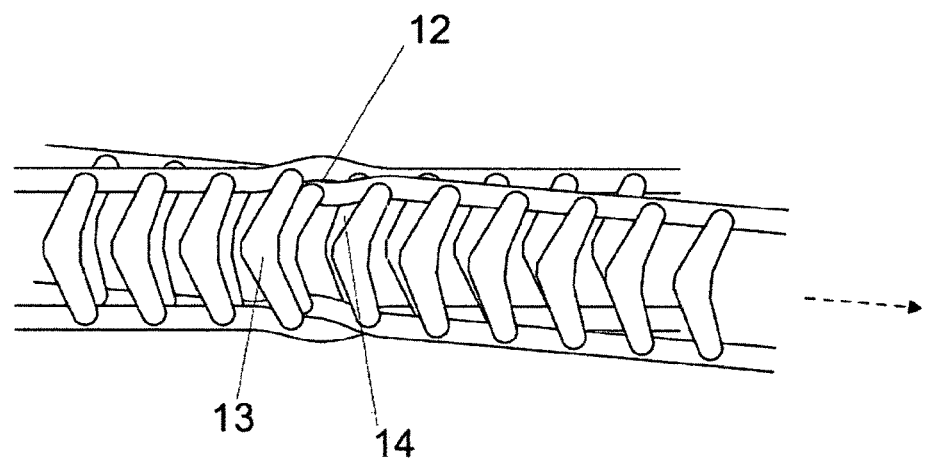
FIG. 14 shows a plan view of a first portion of the tie strip, passing through an aperture of a second portion of the tie strip, when pulled in the forward direction.
Figure 15:
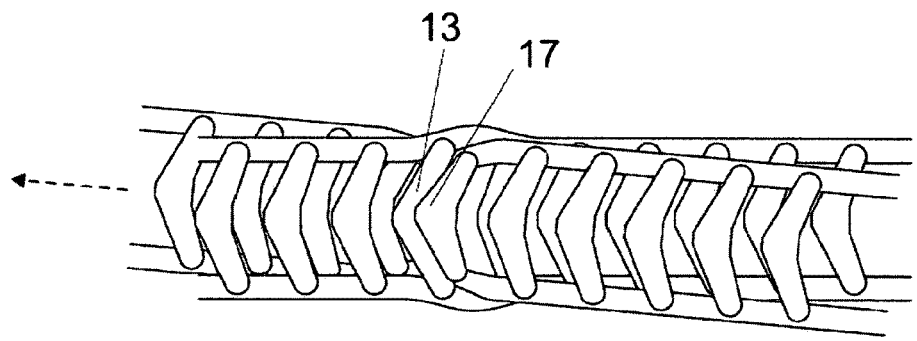
FIG. 15 shows a plan view of a first portion of the tie strip, latching against the rear rung of an aperture of a second portion of the tie strip, when pulled in the reverse direction.
Figure 16:
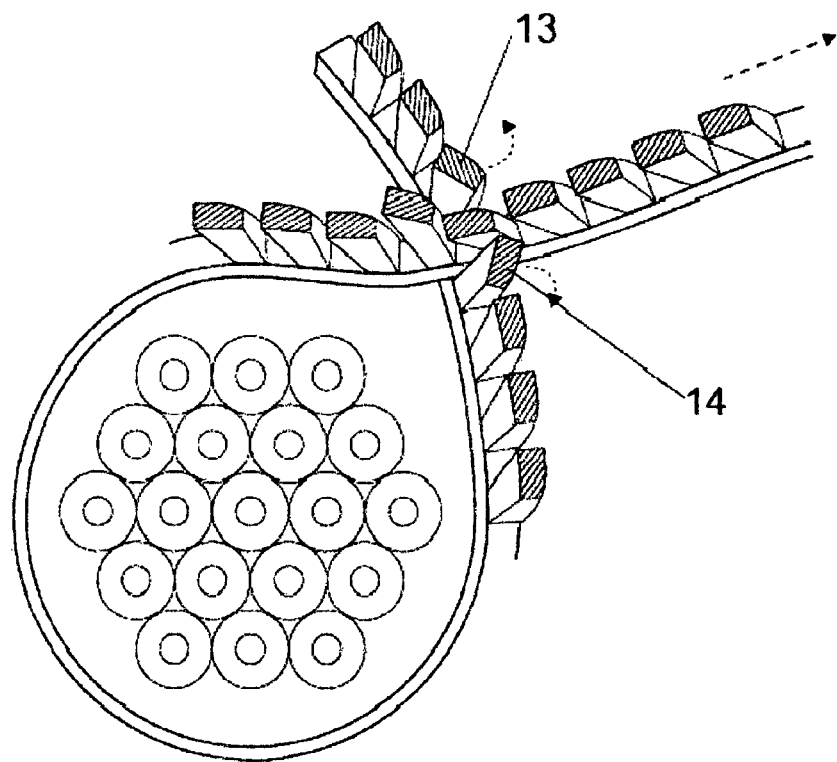
FIG. 16 shows a cross-sectional view of a looped portion of tie strip with the illustrated rungs sliding past each other when pulled in the forward direction, together with front and rear rungs of the aperture rotating forwards during threading.
Figure 17:
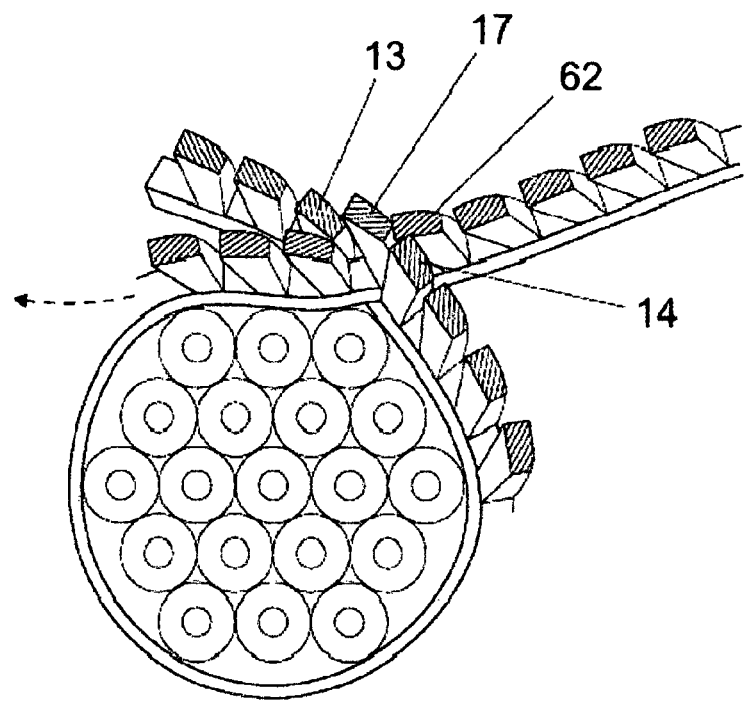
FIG. 17 shows a cross-sectional view of a looped portion of tie strip, with the illustrated rungs interlocking with one another when pulled in the reverse direction.

As shown in FIG. 1, the tie is fitted by passing the front end of the strip through a remote aperture 12 and pulling to size. The geometry described above allows the rungs to slide over one another in the forward direction (FIGS. 14 and 16), but not when pulled in reverse (FIGS. 15 and 17), since the rungs 13, 17 will then tend to co-operatively and securely lock either by butting up against each other (FIG. 21a), or by one rung 17" sliding up and over a second rung 13 to overlap and interleave (FIGS. 17 and 21b).

Figure 18:
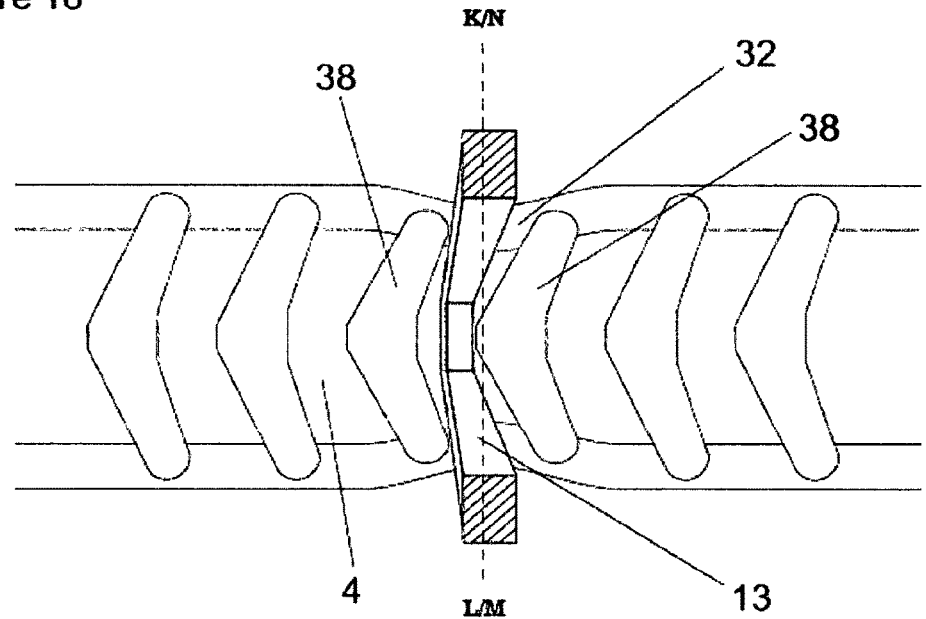
FIG. 18 illustrates the inter-rung snagging that occurs if the rungs do not overlap or are longitudinally spaced too far apart, together with the flattening of the rungs bounding the aperture.

By increasing the longitudinal rake angle 11, the longitudinal overlap between adjacent rungs is increased (FIG. 19a), and this serves to make threading smoother. As denoted by the dashed line G-H, the apex of a first rung 15 overlaps the basal portion of the adjacent rung 16, a configuration that means the second rung 16 will be reached before the first rung 15 has passed completely through the threading aperture. The rear rung 13 bounding the threading aperture cannot therefore snag in the apertures 4 left between adjacent rungs. As shown in FIG. 18, this may occur if the rungs are made too straight (insufficient rake) or are placed too far apart.

Figure 19:
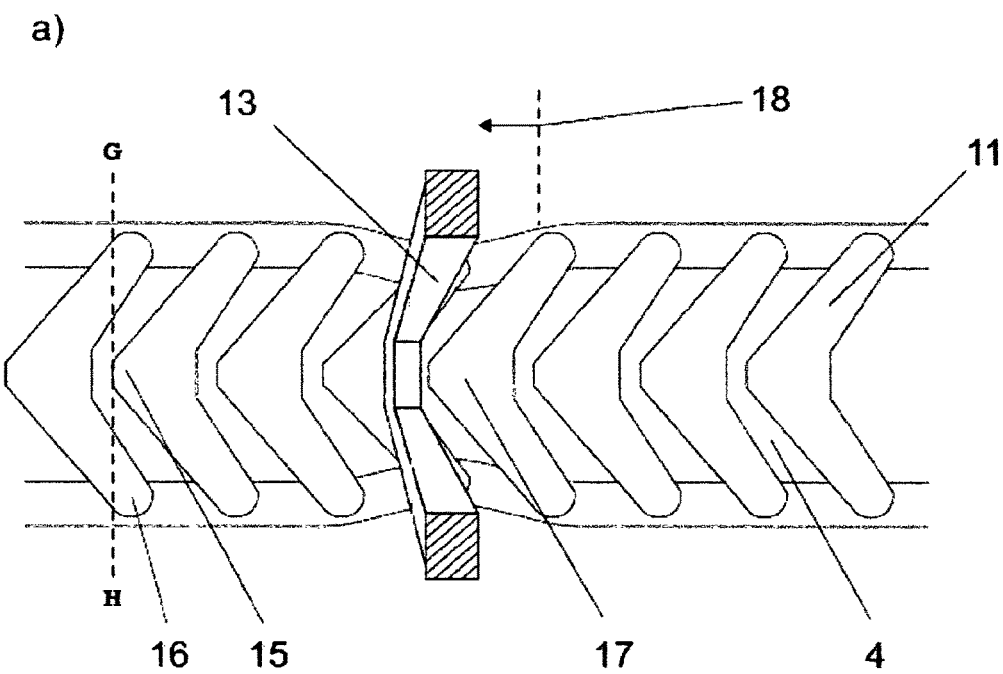
FIG. 19 illustrates the increased backlash and longitudinal narrowing of the apertures that occurs as the longitudinal rake and overlap of the rungs are increased.
Figure 19:
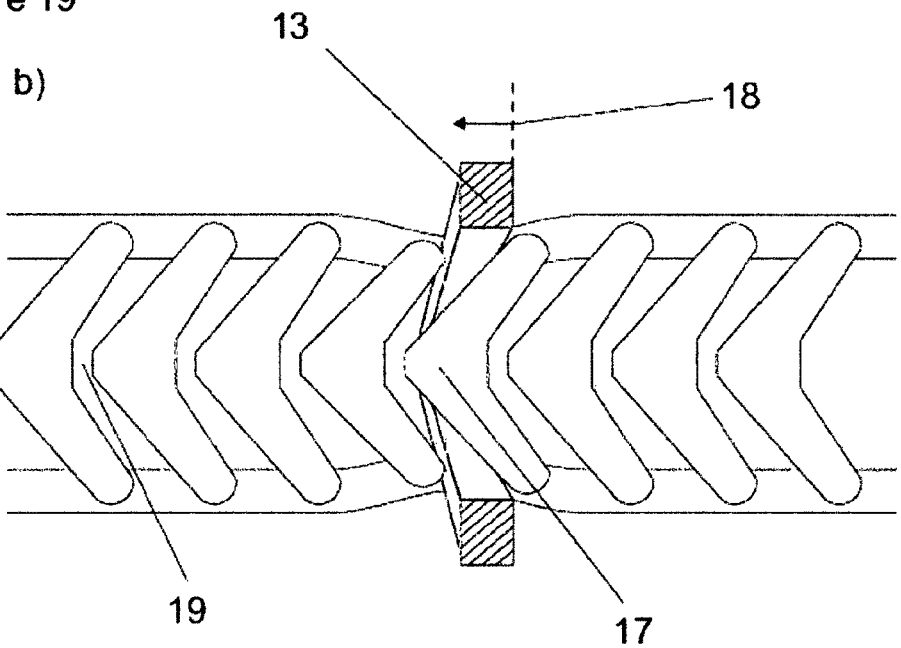
Figure 20:
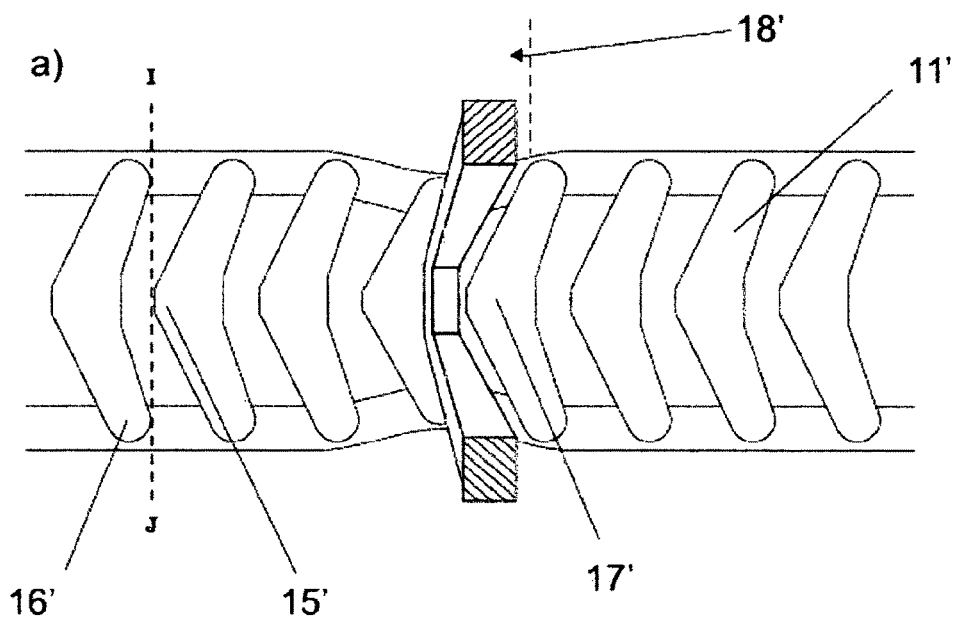
FIG. 20 illustrates the reduced backlash and longitudinal widening of the apertures that occurs as the longitudinal rake and overlap of the rungs are reduced.
Figure 20:
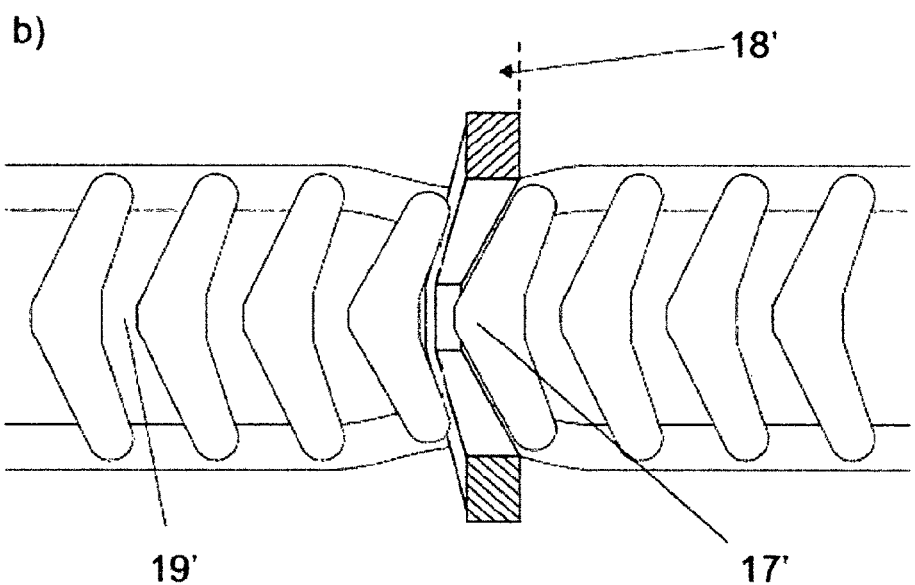

However, increasing the longitudinal rake angle also has detrimental effects, as may be compared in FIGS. 19b and 20b. The relative width of the aperture 19, 19' depends on the rake angle, and if that angle is increased too much the aperture may become so narrow that it makes threading difficult or impossible. Furthermore, if the overlapping latching method is employed (FIG. 21b), then increasing the longitudinal rake will also increase backlash in the latch, since the rear rung of the aperture 13 must first clear the apex of the latching rung 17 (FIG. 19a) before the latching rung 17 can slide back over it to form a latch (FIG. 19b). The arrow and dashed-lines 18 show the direction and distance that the latching rung 17 must move through in order to engage the latch once its apex has been so cleared.

Because particular embodiments of the present invention may be effectively inelastic, this backlash determines how tightly such ties may be fitted. Hence in many circumstances it should be minimised, and this may be done by reducing the rake angle 11' as shown in FIGS. 20a and 20b, where the corresponding backlash 18' is significantly reduced. It can be noted from the dashed line I-J indicated in FIG. 20a that the apex of the first rung 15' is now only just level with the basal portion of the adjacent second rung 16', however this is generally enough to prevent snagging. Indeed, a small gap between the apex of one rung and the base of the next is acceptable if it is not significantly greater than half the thickness of the side rail, and preferably less than one whole thickness of the side rail. Such a configuration helps ensure that at all times at least some portion of one rung is in contact with the inside wall of the rear aperture rung 13, a condition that is just exceeded in FIG. 18.

In a similar manner, variations in the vertical rake angle also have positive and negative effects an the performance of the tie strip, as shown in FIGS. 21a and 21b. Increasing the vertical rake makes the latching rung stand higher above the side rails, which provides such a rung 17" either with more surface area on which to engage the rear rung of the aperture 13 and latch face on (FIG. 21a), or makes it easier for the rung 17" to rise over it 13 and create a latch by the overlap of the two rungs (FIG. 21b). This latter method affords a greater integrity of the latch (albeit with the backlash effects described above), since when properly engaged, the two co-operating rungs 13, 17" mate substantially over their entire surface area. In this way, the farce on the latch is more evenly distributed, and ideally, when in position, these two latching rungs form a curved or arch shape to make the latch stronger than could be achieved if they remained substantially planar.

Figure 21:
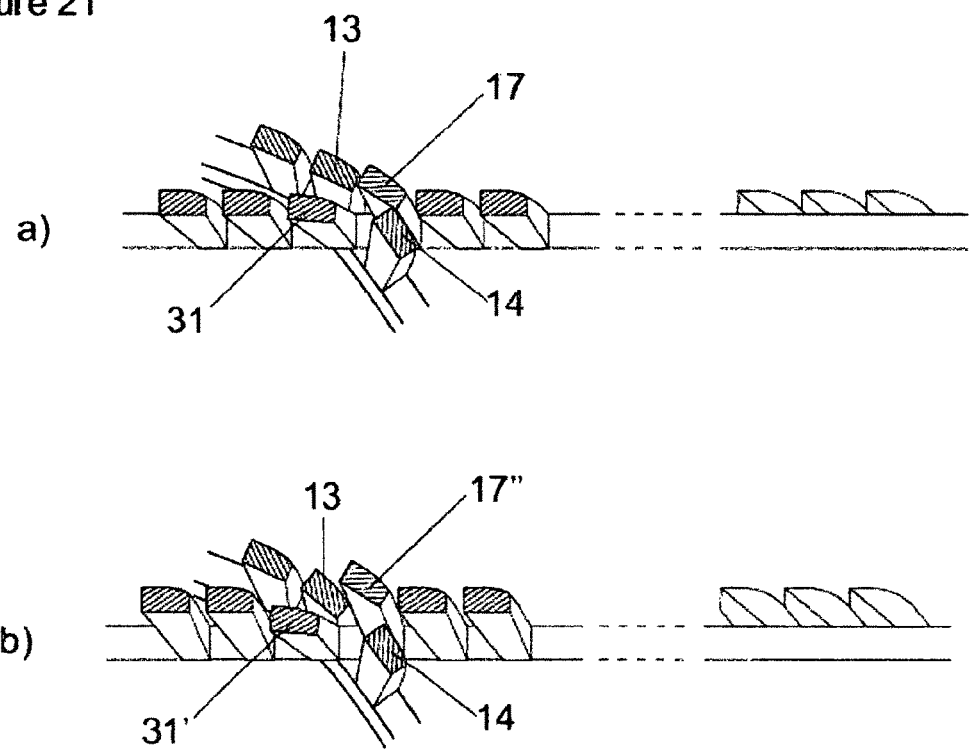
FIG. 21 illustrates how the latching process can be improved by increasing the vertical rake of the rungs and how the rungs are pressed downwards when passing through the aperture.

Raising the rungs to improve the latch can, however, impede the threading process since the rungs must also be deflected 31 beneath the rear aperture rung 13 as they pass through the aperture (FIG. 21). Increasing the vertical rake increases the amount of deflection required 31', and this tends to require more force which makes the strip harder to thread. To alleviate this somewhat, the basal point where the rungs meet the side rails can form a rotation joint (as further described below relating to FIG. 16), and the rungs 31 may therefore rotate downward as they pass through the aperture, significantly lowering the force required to deflect them.

Figure 22:
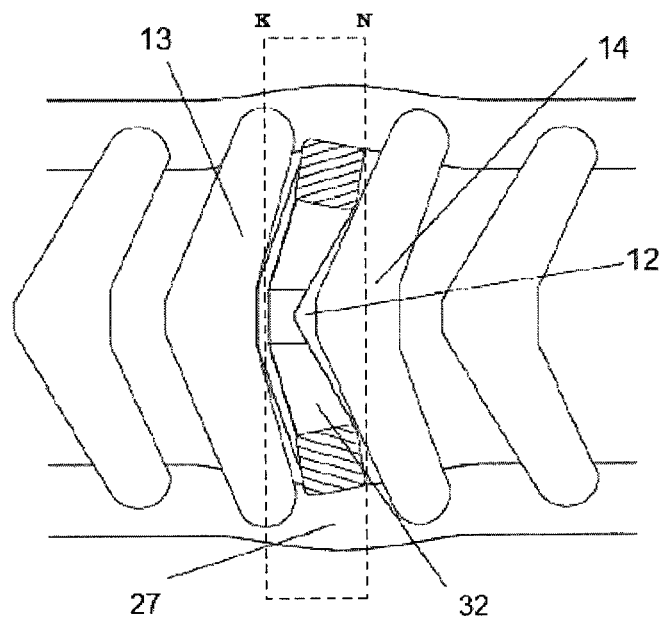
FIG. 22 shows the rake angles and aspect ratios of the rungs creating an aperture shape that closely matches the deformed cross-sectional shape of the strap during threading, together with the deformation of the aperture bounding rungs.

Although tie strips for diverse applications may require differing rake configurations, in general the rungs will have broadly similar backward and upward rake angles, such that the shape of the apertures 4 closely match the cross-sectional profile of the rungs 3. As shown in FIG. 22, this matching of shapes can take into account the deformations of the rungs and side rails that inevitably occur during threading. Thus, the rungs 32 passing through the aperture 12 are seen to fit closely, although the amount of clearance may in practice be increased to promote easier threading.

As well as the backlash effect discussed above, another factor that affects how tight the tie may be pulled is the spacing between successive latching points. This distance should accordingly be minimised by making the rungs and apertures as narrow as possible. However, as seen in FIG. 22, the inserted portion of the strip 32 is broadly perpendicular to the aperture portion 12, hence the width of the apertures must be generally comparable to the thickness of the strip to allow such insertion.

Figure 33:
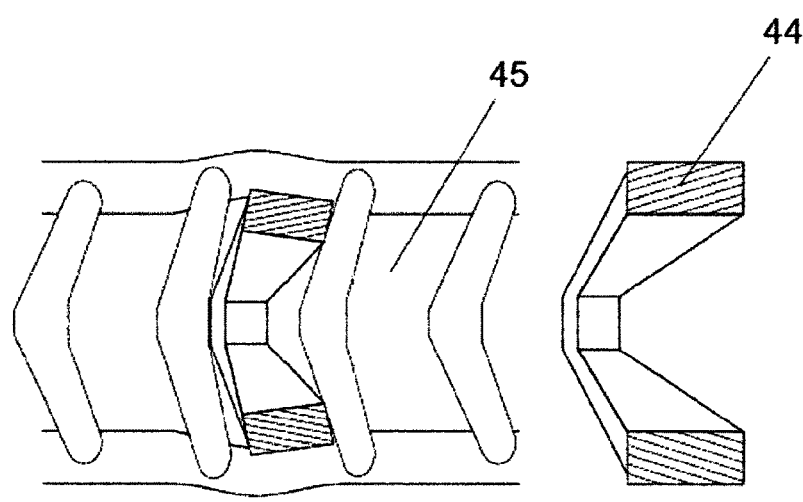
FIG. 33 illustrates a portion of strip with tall and narrow side rails and rungs.
Figure 34:
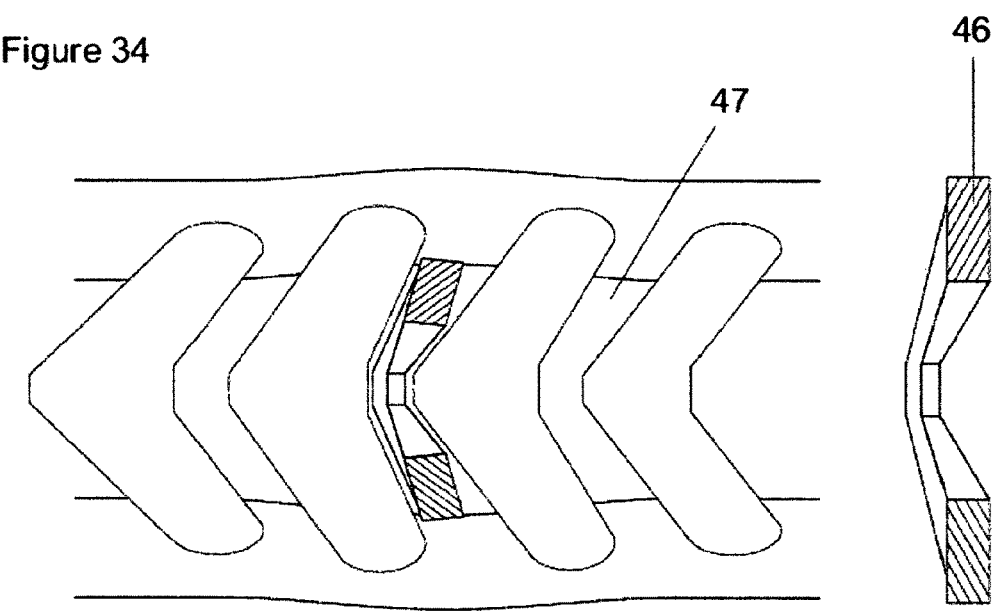
FIG. 34 illustrates a portion of strip with wide and thin side rails and rungs.

If, whilst maintaining the same cross-sectional area, either the side rails and/or rungs were made tall and narrow 44 (FIG. 33), the aperture width would have to be increased 45 to allow for free passage, hence the spacing between consecutive rungs (and therefore between successive latching points) would also be increased. Conversely, if the side rails and/or rungs were made wide and thin 46 (FIG. 34), the apertures could be made much narrower 47 and still permit easy threading. However, the distance between latching points would still increase due to the increased width of the rungs, as would the overall width of the strip due to the increased width of the side rails.

Accordingly, both side rails and rungs will have a generally square cross-section in a simplified configuration, and to maintain equivalent tensile strength throughout all portions of the strip, the cross-sectional areas of the two are broadly similar. In such a simplified implementation, the distance between successive latching rungs is therefore approximately twice the thickness of the strip. I.e., the longitudinal extent of the rungs and apertures are essentially the same, or, at least, their combined longitudinal extent is roughly twice the strip thickness (c.f. FIG. 3).

In practice, the strip is designed to deform slightly during threading and latching, especially where variable aspect ratios are employed on the rungs or rails. This means the strip can squeeze through an aperture that is seemingly too small, hence apertures can be somewhat narrower than the nominal strip thickness, and the rungs can be somewhat wider, especially along the centreline (FIG. 3). Additionally, the rungs may be highly angled 41 such that the apertures cut through the strip obliquely (FIG. 27a) rather than perpendicularly. It is then seen that the vertical projection of the apertures 42 is less than their actual width 43, and in a more extreme implementation of this principle, the centres of the rungs could even overlap. (It should be noted, however, that the actual width of the apertures 43 must still be sufficient to permit easy threading.)

Figure 35:
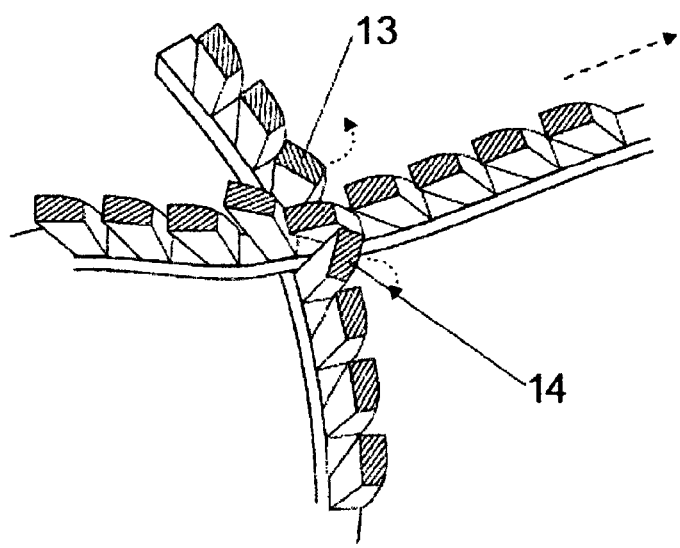
FIG. 35 illustrates the closing up of the rungs that may occur if the tie strip is pulled hard against the rear rung of the aperture during threading.

Even though these techniques allow the rungs to be moved much closer together, some caution must be exercised because the rungs passing beneath the rear aperture rung 13 need sufficient clearance to readily move downwards 31 during threading. In practice, the strip tends to be pulled firmly upwards against the rear rung of the aperture 13 during threading (FIG. 35), and the rungs passing through the aperture will therefore tend to close up and may collide with each other 63, which can seriously impede threading.

However, the same effect may also be employed beneficially in latching (FIG. 17) wherein the rung 62 preceding the latching rung 17 is seen to connect with the latching rung 17. This configuration serves to reinforce the integrity of the latch, since, in order for it to slip, both the latching rung 17 and the reinforcing rung 62 need to give way before the rear rung of the aperture 13 can slip back over them. To maximise their potential, the rungs should therefore be placed as closely together as possible whilst ensuring they do not collide during aggressive threading.

Figure 25:
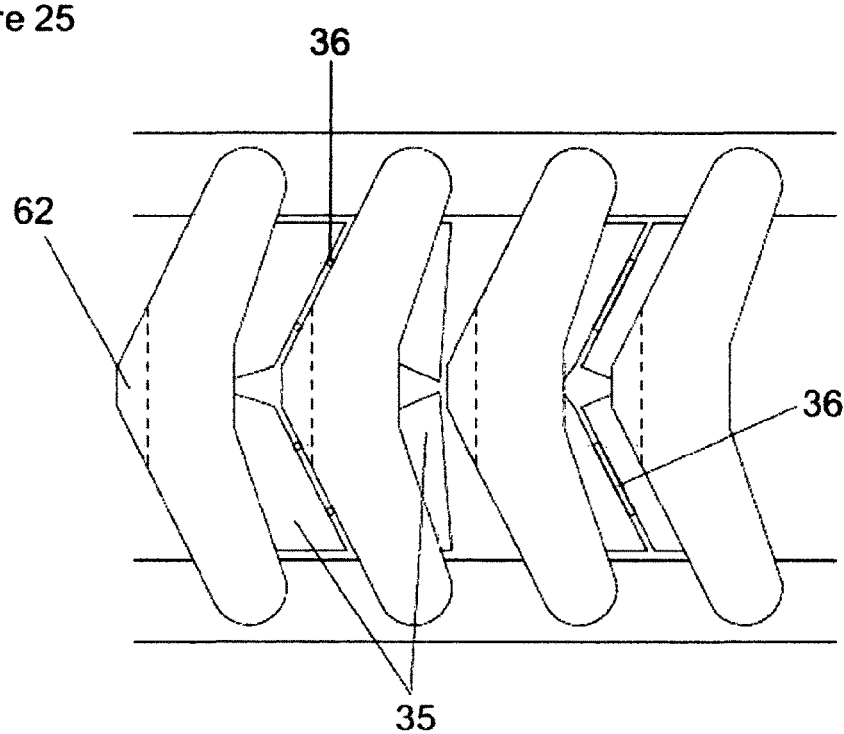
FIG. 25 shows different types of internal wings extending from the rungs to increase rotational leverage, together with a notched recess on the bottom of each rung.

Returning to FIG. 22, it is seen that when a portion of strip 32 is inserted through an aperture 12, the strip deforms to closely match the shape of the aperture. Only minor deformations of the geometry are required to achieve this, and these may come from a combination of sources:

Because the rungs incorporate a double rake 8 (FIG. 5), at the point of insertion the two aperture-bounding rungs 13, 14 may vertically flatten and/or laterally straighten to increase the lateral width of the aperture (FIG. 22). This effect may be enhanced by incorporating small notches 33 or slots 34 into the rungs (FIG. 23). Furthermore, as shown in FIG. 16 by the dotted arrows, the front rung 14 of the aperture may pivot around it's basal side arm portions to rotate forwards and additionally increase the size of the aperture. Similarly, the rear rung 13 may rotate backwards to achieve the same effect. To provide extra leverage for this rotation, the rungs may be fitted with wings 35 projecting into the aperture as shown in FIG. 25. These may extend from either edge of the rung and may be additionally interconnected by thin web portions 36, which serve to prevent such wings from interfering with threading until broken by the insertion process. The wings may be made somewhat thinner than the rung itself, although by increasing their relative thickness they may additionally serve to improve the strength of the latch after fitting.

As also shown in FIG. 22, the aperture 12 may be further enlarged by its two bounding side rails bowing outwardly 27, and this may be encouraged by adjusting their aspect ratio to make them taller and narrower at this point 27' (FIG. 23), without unduly altering their overall cross-sectional area.

Figure 24:
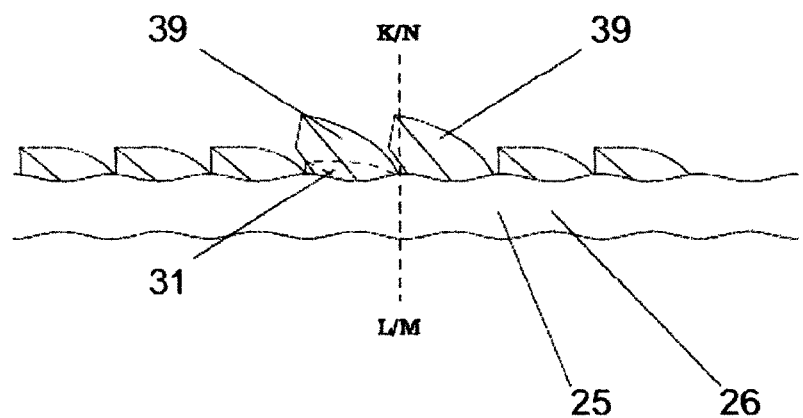
FIG. 24 shows the upward deformation of the rungs on the threaded portion of strip along the cross-section K-L indicated in FIG. 23.

Further deformations also occur to the threaded portion of tie strip 32 passing through said aperture (FIG. 18), wherein the strip narrows as its side rails bow inwards and the adjacent rungs 38 laterally compress. Again by virtue of the double rake, these lateral compression forces—exerted through the planar-section K-L-M-N shown in FIG. 22—cause the rungs passing through the aperture 12 to flex both inwardly 38 (FIG. 18) and also upwardly out of the plane 39 (FIG. 24). However, (as noted above), as the rungs pass beneath the rear aperture rung 13, this upward component is kept in check 31, and the rung is instead temporarily forced or rotated downwards 31 (FIG. 21). Nevertheless, once such passage is complete, the rung will be free to stand proud of the strip 39, as is necessary to successfully create the latches 17 and 17" shown in FIG. 21.

Figure 28:
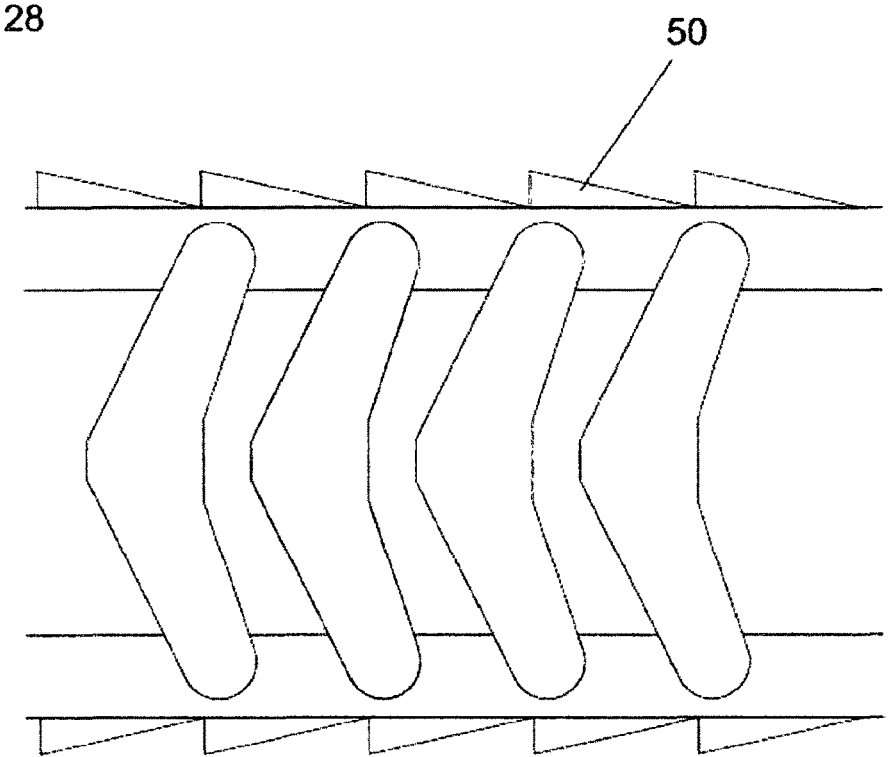
FIG. 28 illustrates the addition of side latches to compliment the rungs.
Figure 29:
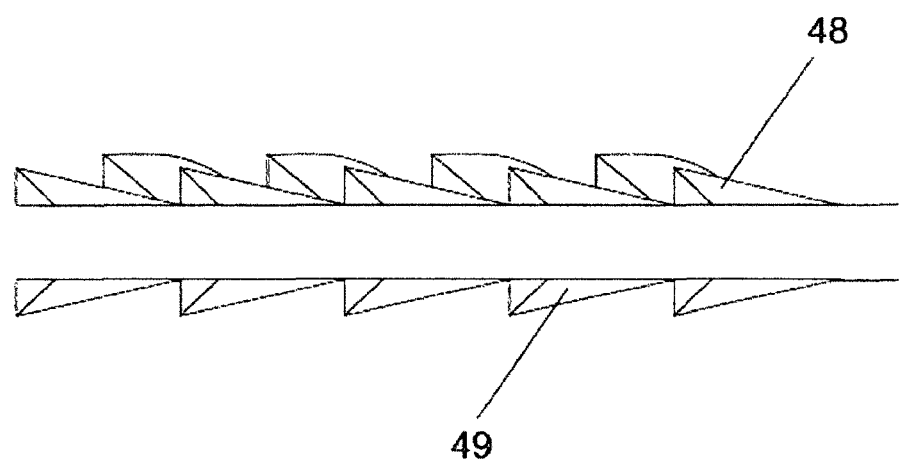
FIG. 29 illustrates the addition of top and bottom latches to compliment the rungs.

Thus by exploiting a combination of the above deformations, a tie strip using an inelastic material such as nylon can be made to quite readily pass through itself to form a closed loop, and thereafter securely latch itself in place. A particularly lenient combination can even allow the addition of extra teeth-like projections to the top 48, bottom 49 or sides 50 of the rails to provide for better latching (FIGS. 28 and 29).

Notwithstanding the above, there are also three additional factors that can significantly affect the performance of the tie strip and the forces required to use it. These are the relative width of the aperture and side rails, the overall size or scale of the tie strip, and the material from which it is made. In general, increasing the relative width reduces the forces required to pull the bulk strip through a remote aperture, and in practice, tie strips according to the present invention should be approximately 6-8 times wider than the side rails, with apertures approximately 4-6 times wider than the side rails. These figures may be adapted depending on the size of the tie strip and the material of construction, with larger ties and stiffer materials generally requiring higher ratios, and smaller ties and softer materials requiring lower ones.

Higher ratios, however, may reduce the latching effect since they will not pinch the threaded strip 32 (FIG. 18) as much as lower ratios. The rungs that form the latches 17 may therefore not rise up sufficiently high to engage properly, and the rake angles may need to be adjusted accordingly. Lower ratios, on the other hand, may also be sub-optimal, since they reduce the aperture width and make threading much harder.

In terms of scale, it can be noted that for any given material, whilst cross-sectional strength generally scales linearly, flexibility (as per test methods ASTM D790 or ISO 178) scales as a cube. (i.e., halving the thickness will halve the tensile strength, but the flexibility will increase eight-fold.) Hence smaller embodiments of the present invention can make use of much stronger but stiffer materials because the stiffness diminishes more quickly than the strength as the size is reduced. The overall size and specific geometry of a tie strip designed according to the present invention must therefore take into account both the tensile and flexural properties of the chosen material of manufacture.

Such choice of material can also have an effect on latching, since it is possible to settle the two rungs into a more sympathetic latching condition by exploiting the yield point of the material from which the tie strip is made. If the tie strip is designed such that maximum tensile force encountered during use is similar to the tensile strength at yield, then under loading the strip will begin to stretch at its weakest spot. If this feature is deliberately incorporated into the rungs, then such yielding can preferentially align the polymer molecules to increase their strength, and can change the shapes of the rungs into shapes more favourable to providing for a stronger latch. This mechanism can serve to relieve the overall force applied to the fitted tie, and as a result, the tensile loop strength may actually exceed the theoretical limit imposed by the tensile strength of the side rails or rungs. (This phenomenon can also occur to some degree even if the yield point is not fully exceeded.)

Figure 31:
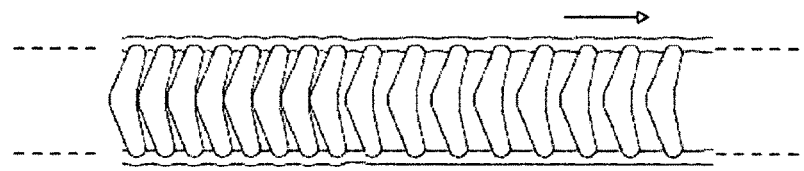
FIG. 31 illustrates yield-point stretching of the side rails to extend the strip longitudinally from an initially more contracted state.
Figure 32:
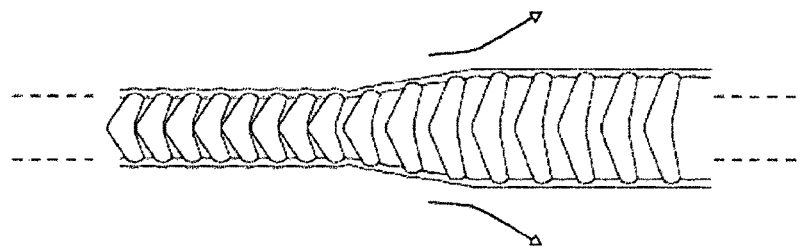
FIG. 32 illustrates yield-point stretching of the rungs to extend the strip laterally from an initially more contracted state.

Yielding may also be employed to open up and strengthen through molecular alignment) the rungs and/or side rails during or before use, such that they may be initially made in a more compact condition and then expanded. The effect may be obtained locally by the process of threading the strip through an aperture and pulling firmly, or it may be applied globally to the entire strip post-manufacture. In both cases, an initially more contracted shape is expanded either laterally (FIG. 31) and/or longitudinally (FIG. 32) into a more functional one, and potentially strengthened in the process.

It can be noted that nylon 6 (polycaprolactam) is more suitable for this process than nylon 66 (polyamide), since the tensile strength at yield is lower than the tensile strength at break. It may therefore pass the yield point and deform without failure, whereas nylon 66, on the other hand, tends to break before yielding, and hence is not so suitable. Since the plasticisation of these materials can dramatically influence both their tensile and flexural properties, this mechanism provides another means to control the overall function of the tie strips present herein.

Finally, although the tie described above may in principle be formed with indefinite length (and potentially fitted from a reel with a mechanical applicator device), a more practical design comprises a discrete length, typically up to one meter in length.

Figure 2:
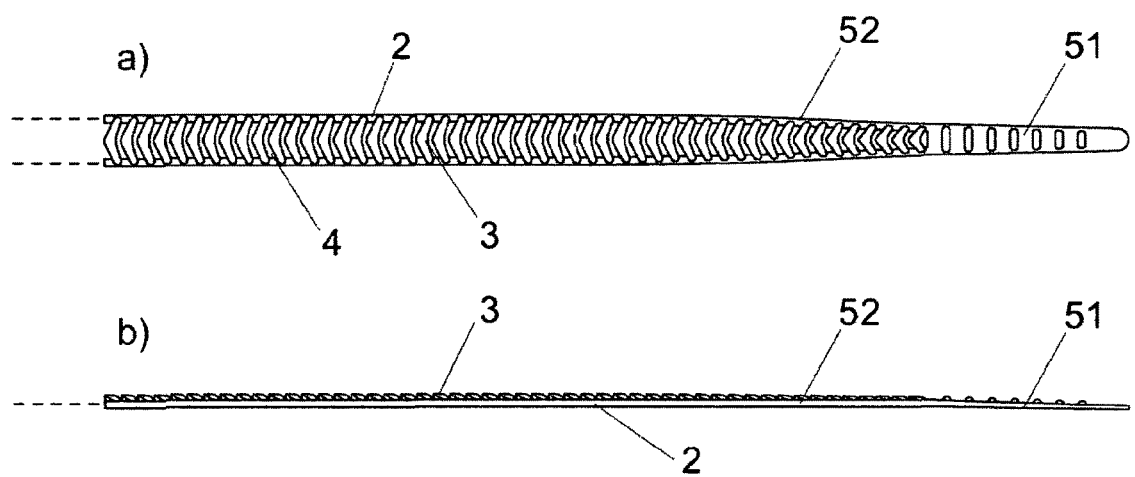
FIG. 2 shows a plan view and a side of the present invention including a tapered feed zone and tongue.

Such a tie strip would be equipped with a tapered portion at the front end (FIG. 2) consisting of a pointed tip or tongue 51 and/or a tapered feed zone 52. Said tongue provides for easier insertion into a remote aperture and may be equipped with raised grips or knurls if desired, whereas the tapered feed zone allows for an easier start to the threading process by gradually transitioning horizontally (FIG. 2a) and/or vertically (FIG. 2b) from the narrower point of the tongue to the full width of the tie strip proper. The rungs of this tapered feed zone may be laterally truncated and/or vertically compressed compared to those of the main body, but it properly shaped, they may also serve as grips for pulling the tie strip though itself.

Standard cable ties are usually made from nylon 66 (polyamide) materials, which when conditioned to hygroscopic equilibrium (approximately 2 to 3% moisture content at 23° C. and 50% relative humidity) typically achieve a tensile strength of 50 to 80 MPa (as per ISO 527) and a flexural modulus of 750 to 1500 MPa (as per ISO 178).

To attain the minimum loop tensile strength required by industry of 50 lbs (22.7 kg), it follows that a transverse cross-sectional area of at least 3 to 4 $mm^2$ is therefore necessary.

With reference to FIG. 1, a first preferred embodiment of the present invention comprises two generally parallel side rails 2, each with a cross-sectional area of approximately 0.8 $mm^2$, and interconnecting rungs 3 with similar cross-sectional area. When formed into a loop, the tensile forces are distributed through all four side rails, affording a total cross-sectional area of 3.2 $mm^2$, which gives an overall minimum loop tensile strength of 23 kg when using a material with a tensile strength of at least 72 MPa. A typical polyamide in this strength range has a flexural modulus around 1.4 GPa, although if available, materials with a lower figure are preferred, ideally around 1.0 GPa.

To provide the requisite 0.8 $mm^2$, the side rails should be approximately 0.9 mm wide and 0.9 mm thick, and should preferably have a rhomboidal cross-section 24 with the sides angled at around 5 to 10° (FIG. 12b). (In practice, a square cross-section is also acceptable.)

The interconnecting rungs have both longitudinal and vertical rakes of approximately 20° to 30°, the two angles being broadly similar, though not necessarily identical. Practically, the vertical rake may be 5 to 10° lower than the longitudinal rake to account for the deformations that occur during threading, thus an average longitudinal rake of about 25° and an average vertical rake of about 20° would be typical. (Both angles are as measured from the lateral perpendicular to the side rails, as represented by the section A-B depicted in FIG. 3.)

However, it should be noted that because the rungs are tapered towards the centreline both laterally and vertically 8 (FIG. 5), the top of the rung 57 of the first preferred embodiment has a vertical rake of nearer 15° whereas the bottom of said rung 58 has a rake of nearer 25°. Likewise, the inner (front) edge of said rung 59 has a longitudinal rake angle of approximately 20°, whereas the outer (rear) edge 60 has a longitudinal rake of approximately 25°.

The basal arm portions of the rungs where they connect with the side rails 53 (FIG. 3) have an aspect ratio approximately the same as the side rail from which they extend. However, at the point where they break out of the side rail 54 the aspect ratio has tapered slightly, and the basal arms are now slightly wider than they are thick. Nominally they may be approximately 0.95 mm wide and 0.85 mm thick at this point.

Whilst maintaining a substantially similar cross-sectional area, the rungs continue to taper towards the centreline portion 5 where they have a cross-section with an aspect ratio of roughly 2:1. Hence in this first preferred embodiment they would be approximately 1.3 mm wide and 0.65 mm thick, giving a typical cress-sectional area of about 0.85 mm$^2$. This is slightly greater (about 6% more) than the cross-sectional area of the side rails, which means the weakest spot in the present design is the side rail portions that reside between adjacent rungs.

The vertical rake angle of the bottom of the rung (approximately) 25°) is such that at its centreline, the bottom edge of the rung 55 is approximately level with top edge of the side rails 56 (FIG. 5). This arrangement provides for both a sufficiently functional geometry and also allows for easier manufacture, since the parting line of an injection mould tool may be placed along this edge. This then allows the tops of the rungs to be cut into one side (typically the fixed half), and the rails and bottoms of the rungs to be cut into the other side (typically the moving half). In this configuration, it can be noted that both halves of the mould may conveniently start as flat plates.

As the rails are approximately 0.9 mm thick, the aperture space 4 between adjacent rungs must also be approximately 0.9 mm at their widest, and as mentioned above, at the points where the rungs break out of the side rails 54, the rungs are approximately 0.95 mm wide. Thus the overall distance between successive rungs is about 1.85 mm (rung width plus aperture width). This provides for a sufficiently close latch index that compares favourably with the roughly 1.5 mm index encountered on the standard Wrobel cable ties as described in the prior art.

Since the vertical rake angle on the bottom of the rungs is approximately 25°, the nominal width of the aperture of this first preferred embodiment should be approximately two times the thickness multiplied by tan(65°) or 3.86 mm (2×0.9×tan(65°)), and the nominal overall width should be about 5.66 mm.

In practice, given the relatively high flexural modulus of polyamides with the required strength, a tie strip with a slightly wider aperture of about 4.5 mm (and increased width to about 6.3 mm) is found to be more suitable.

To avoid reducing the vertical rake angle, this additional aperture width takes the form of a small flat section 64 which widens the centreline portion (FIG. 8b). Thus the total width for the first embodiment of the tie strip has an approximate side-rail to aperture-width ratio of 1:5, and an approximately side-rail to overall-width ratio of 1:7. (Without the additional bridge section 64, the nominal ratios are approximately 1:4.3 and 1:6.3 respectively.)

Figure 26:
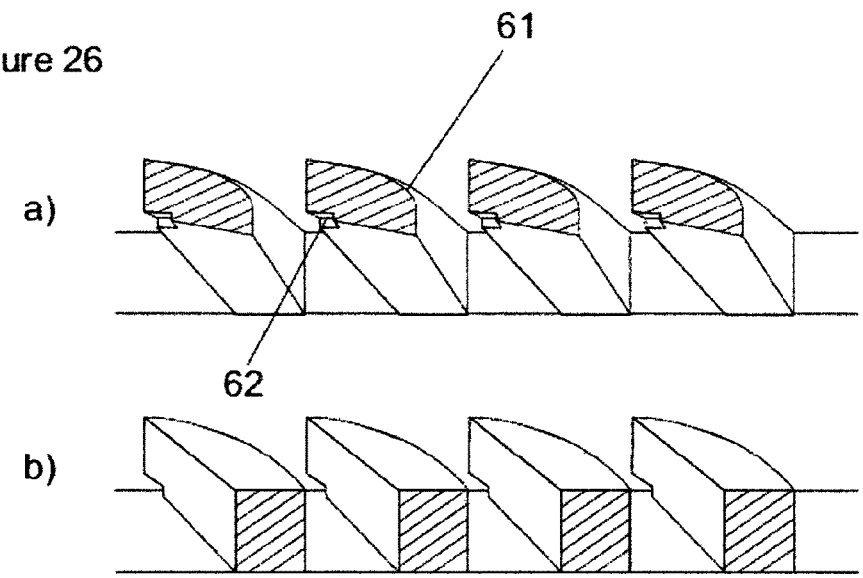
FIG. 26 illustrates a preferred cross-section through the rungs with an angled profile and a notch cut beneath the rear centre of each rung.

The ease of threading can also be increased somewhat by using a lubricated polymer, by rounding the leading edges of the rungs 61 (FIG. 26) and by adding a cutaway notch 62 on the underside of the rear portion of the rungs (FIGS. 25 and 26). These notches serve to create slightly more space between the rungs, and also assist in latching, as the notch in the latching rung 17 can more effectively overlap the rear rung of the aperture 13.

A generic low-grade nylon 66 would be expected to have a tensile strength of around 45 MPa, and to make use of these more readily available materials, a slightly larger embodiment of the present invention may be employed. Specifically, a tie strip as described above would require side rails approximately 1.14 mm wide and 1.14 mm thick to provide a total of 5.2 mm$^2$ in cross-sectional area along the four side rails forming the closed loop. This offers a maximum loop tensile strength of approximately 23.4 kg, and such a tie strip would have a nominal aperture width of about 4.9 mm and an overall width of about 7.2 mm. (Ratios 1:4.3 and 1:6.3.)

Alternatively, a nylon 6 material with a similar strength may also be used with this embodiment. These materials have a lower flexural modulus of around 800 MPa, and such a tie strip is therefore more flexible and easier to use.

Figure 27:
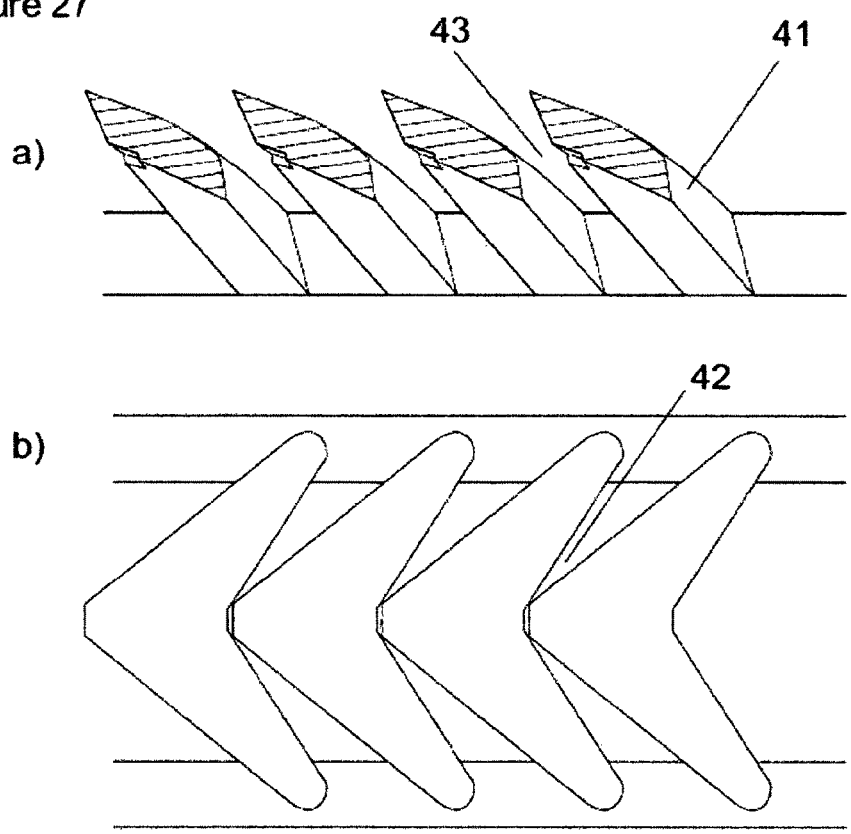
FIG. 27 illustrates a second preferred cross-section through the rungs with a steeply angled profile such that the apertures pass through the tie strip at an angle.
Figure 30:
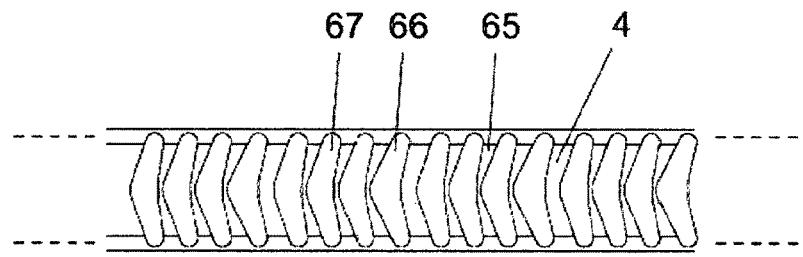
FIG. 30 illustrates sequences of rungs with variable geometry and intermittent apertures suitable for threading.

The centre portions of tie strips made according to this embodiment would be approximately 1.6 mm×0.80 mm, and the rung/latch spacing would be approximately 2.3 mm. In order to reduce the latch spacing below this figure, the rungs could be rotated forwards to provide for oblique apertures as shown in FIG. 27 (and thereby slightly increase the vertical rake angle), or the rungs could be positioned with intermittent spacings (FIG. 30), wherein two types of aperture are formed: a standard threading aperture 4, and a narrower latching aperture 65.

The standard threading apertures 4 are placed every few rungs along the strip and are employed as usual when forming a closed loop.

Meanwhile the more numerous narrower latching apertures 65 serve only to separate the latching rungs 67. In this embodiment, the rungs bounding the rear of the threading apertures 66 are formed as normal, whereas the latching rungs 67 are made slightly narrower than normal.

Since the bulk of the rungs are both narrower and bounded by narrower apertures, their spacing is somewhat less than the optimum 2.3 mm, and in practice may be around 50-75% of that figure. Thus, although the rungs adjacent the threading apertures are still at the requisite larger spacing, the majority are much less, and the overall average is accordingly reduced. In practice, there are 4 to 10 latching apertures between every threading aperture.

Minor modifications to this specification could be made if required. In particular, the rake angles could be increased slightly to make the strip easier to use, and the thickness of the side rails could be increased to improve strength (or to use a weaker material). However, in both cases the rung spacing and degree of backlash may also have to increase to compensate.

The design may be readily scaled up or down as required for specific applications, and may be adapted to operate with other materials offering suitable strength and flexibility. Functional tie strips according to the present have been successfully manufactured using poly-ethylene, poly-propylene, poly-caprolactam (nylon 6), polyamide (nylon 66), poly-caprolactone, poly-urethane, poly-lactic acid and poly-hydroxybutyrate.

The invention claimed is:

1. A multiple-use tie strip, formed in a ladder-shaped construction comprising
    two substantially linear side rails of generally uniform cross-section, the rails being interconnected by a plurality of spaced curved or chevron rungs which define between them similarly shaped apertures, wherein the tie strip is constructed such that a front end of the tie strip can pass through one of said apertures in a first forward direction and form a closed loop, but when pulled in a second reverse direction, at least two of the plurality of rungs form a boundary around said one aperture and engage to form a co-operative latch and thereby prevent withdrawal, wherein each of the plurality of rungs has a central part with an apex and side arms defining a basal portion that forms a rotation joint where each rung meets the side rails, and wherein the side arms are inclined at least longitudinally towards a rear end of the tie strip and vertically to create a double rake angle of each rung that points both backwardly and upwardly.

2. The tie strip according to claim 1, wherein the tie strip is formed from a polymer material.

3. The tie strip according to claim 2, wherein the tie strip is formed from nylon.

4. A tie strip according to claim 1, wherein the side walls are formed with a rhomboidal cross section with side angles of approximately 5° to 10°.

5. The tie strip according to claim 1, wherein the longitudinal and vertical double rake angle is approximately 30°.

6. The tie strip according to claim 1, wherein an aspect ratio of the rungs is adjustable along their length.

7. The tie strip according to claim 6, wherein the vertical double rake angle of one of the plurality of rungs is approximately 15° and the vertical double rake angle of another of the plurality of rungs is approximately 25°.

8. The tie strip according to claim 1, wherein the apex of one of the plurality of rung is at least level or overlaps the basal portion of an adjacent rung of the plurality of rungs.

9. The tie strip according to claim 8, wherein a distance of said aperture between the apex of the one rung and the basal portion of the adjacent rung is not greater than half the thickness of the side rail.

10. A tie strip according to claim 1, wherein a cutaway notch is provided on an underside of a rear portion of each rung.

11. The tie strip according to claim 1, wherein the apex of each rung includes a flattened section which widens a centerline portion of the rung.

12. The tie strip according to claim 1, wherein the tie strip has a tapered front end having a pointed tip leading to a tapered feed portion.

13. The tie strip according to claim 12, wherein said tip is provided with raised grips or knurls.

14. The tie strip according to claim 1, wherein a distance between the at least two rungs is approximately twice a thickness of the tie strip.

15. The tie strip according to claim 1, wherein the linear side rails have a substantially square cross-section.

16. The tie strip according to claim 1, wherein the rungs have substantially the same dimensions to the side rails.

17. The tie strip according to claim 1, wherein the at least two rungs are configured to close together and reinforce each other when the tie strip is used for latching.

18. The tie strip according to claim 1, wherein an overall width of the tie strip is approximately 6 to 8 times greater than a width of the side rails.

* * * * *